Dec. 9, 1969  R. L. JACOBSEN ET AL  3,482,947
FEED DEVICE FOR A FILM REACTOR
Filed July 14, 1966  2 Sheets-Sheet 1

INVENTORS
Ronald Lowell Jacobsen
William Robert Kristoff
Tom H. Ohren
Dale Spatz
BY *Eric S. Spector*
ATTORNEY United States Patent Office 3,482,947
Patented Dec. 9, 1969

3,482,947
FEED DEVICE FOR A FILM REACTOR
Ronald Lowell Jacobsen, Wyoming, William Robert Kristoff, Cincinnati, Tom H. Ohren, Golf Manor, and Dale Spatz, Springfield Township, Hamilton County, Ohio, assignors to The Procter & Gamble Company, Cincinnati, Ohio, a corporation of Ohio
Filed July 14, 1966, Ser. No. 565,189
Int. Cl. B01d 47/00; C10j 1/08; C07c 141/00
U.S. Cl. 23—285                                    7 Claims

ABSTRACT OF THE DISCLOSURE

An apparatus for introducing gas and liquid reactants, e.g. gaseous sulfur trioxide and alpha-olefin, into a single or multiple-tube film reactor. Through the use of controlling orifices it provides for the metering and precise distribution of liquid reactant among the several tubes and around the full circumference of each tube interior surface in order to facilitate the production of uniformly high quality product.

---

This invention relates to a process and apparatus for introducing gas and liquid reactants into a film reactor tube and into each of the various reactor tubes of a multiple-tube film reactor. It provides for the metering and distribution of reactants so as to contribute to the production of uniformly high quality product and is especially useful in the film reaction of gaseous sulfur trioxide and alpha-olefin to produce a reaction mixture which can be converted into an excellent detergent product.

In conventional film reaction processes the liquid and gas reactants are introduced into a reaction zone defined by a supporting and confining heat exchange surface. The liquid reactant is formed into a thin flowing film on the heat exchange surface in the reaction zone and the film is contacted with the gas reactant to produce a substantially complete reaction. Since this reaction is ordinarily highly exothermic, the heat of reaction is in part removed and the temperature controlled by heat transfer through the heat exchange surface.

These processes are conveniently carried out in a reactor tube wherein the gas reactant is introduced centrally of a surrounding annulus of flowing liquid film. A plurality of these reactor tubes is preferably associated together in shell-and-tube arrangement for large scale factory production. Gas and liquid reactants are fed into each of the individual reaction tubes. Cooling water is circulated within the shell, adjacent the reaction zones of the tubes, to control the temperature of reaction. Such a reactor employing a plurality of tubes associated in shell-and-tube arrangement is referred to herein as a "multiple-tube" reactor.

The film reaction of gaseous sulfur trioxide and alpha-olefin to produce a detergent intermediate, and the use of a multiple-tube film reactor for this purpose, have been found highly desirable. These reactants are so highly reactive with each other, and this reaction is so highly exothermic, that unless properly performed, charring of the reaction mixture can often result, accompanied by contamination and discoloration of product. Charring can be a particularly troublesome problem if the concentration of sulfur trioxide is relatively high, or the temperature of reaction is excessive, in any particular portion of a reactor tube. Thus, accurate metering of olefin is necessary to provide a standard or uniform film thickness for proper reaction. Accurate metering of sulfur trioxide is likewise necessary to provide the proper concentration of this reactant. In addition, film surface turbulence is preferably minimized so as to avoid entrainment of olefin drops in the gas stream where the same are out of contact with the heat exchange surface. Backmixing, i.e., contact of reactants outside the reaction zone, is preferably minimized or eliminated.

These metering and distribution problems are increased when a multiple-tube reactor is employed since equal metering to, and distribution within, each reactor tube is necessary for the production of uniformly high quality product. Similarly, accuracy of metering, prevention of backmixing outside the reaction zone and minimizing or elimination of entrainment are preferable in conjunction with other highly exothermic film reactions which are subject to charring and are therefore not limited to application in connection with the reaction of sulfur trioxide and alpha-olefin. Feed devices known to have been described in the prior art are not entirely satisfactory for overcoming these problems.

It is an object of this invention to provide a novel apparatus for introducing gas and liquid reactants, particularly gaseous sulfur and trioxide and alpha-olefin, into a film reactor tube and into each of the various reactor tubes of a multiple-tube film reactor suitable for large scale factory production of reaction product.

It is a further object of this invention to provide an apparatus for introducing gaseous sulfur trioxide and alpha-olefin into a film reactor tube whereby charring is eliminated or significantly reduced thereby providing flexibility in producing improved product.

It is a further object of this invention to provide an apparatus whereby alpha-olefin and gaseous sulfur trioxide are precisely and accurately metered into a reactor tube wherein the gaseous sulfur trioxide is introduced centrally of a surrounding annulus of flowing olefin film.

Another object of this invention is to provide an apparatus whereby alpha-olefin and sulfur trioxide reactants are equally metered to each of a plurality of reactor tubes whereby uniformly high quality proluct is more readily produced.

Another object of this invention is to provide an apparatus for introducing alpha-olefin and gaseous sulfur trioxide into a film reactor whereby entrainment of olefin in the gas stream is minimized.

Another object of this invention is to provide an apparatus for introducing alpha-olefin and gaseous sulfur trioxide into a film reactor whereby the reactants are in contact only in a reaction zone where reaction temperature can be controlled, i.e., backmixing outside the reaction zone is minimized.

Still another object of this invention is to provide an apparatus for introducing a thin flowing film of alpha-olefin into a film reactor.

Yet another object of this invention is to provide an apparatus for introducing alpha-olefin and gaseous sulfur trioxide into a film reactor, which apparatus is easily disassembled for cleaning.

Briefly stated, in accordance with one aspect of the present invention, there is provided a reactor tube, an insert telescoped within said reactor tube, an axial passageway within said insert, and a second passageway intermediate the reactor tube inner surface and insert outer surface. The second passageway is provided with a metering orifice adapted to receive liquid reactant under pressure and to impart to it a controlling pressure drop whereby the quantity of liquid reactant flowing therethrough is precisely metered. The downstream end of the second passageway comprises an annular discharge orifice adapted to receive the liquid reactant from the metering orifice and to distribute it uniformly about the inner surface of the reactor tube with relatively little pressure drop and without substantial effect on flow rate. Gaseous reactant is introduced into the axial passageway and forced therethrough at a predetermined flow-rate into the central portion of the reactor tube at the downstream end of the second passageway. This gaseous reactant passing centrally of the annular flowing film of liquid reactant distributed by the discharge orifice diffuses and contacts the flowing film whereby reaction occurs.

While the specification concludes with claims particularly pointing out and distinctly claiming the subject matter of the present invention, it is believed the present invention will be better understood from the following description taken in connection with the accompanying drawings, in which:

Figure 1:
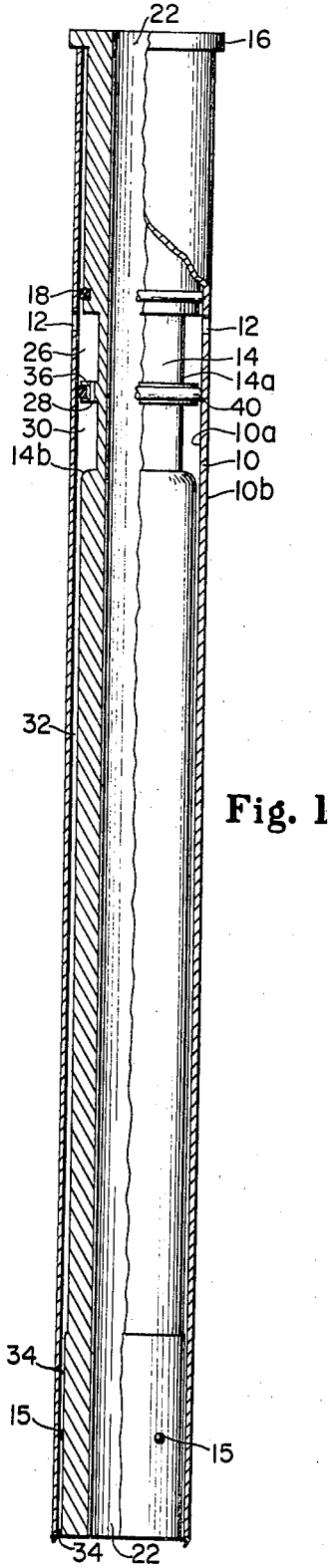
FIGURE 1 is a fragmentary elevational view, partially in section and partially broken away to show interior details of construction, of a preferred embodiment of the apparatus of the present invention.

Referring to FIGURE 1, there is shown the top portion of vertical reactor tube 10 having an inner surface 10a and an outer surface 10b. This reatcor tube is open at the top and contains spaced about its periphery at least one, preferably about four, liquid reactant inlet ports 12. Reactor tube 10 can have a length ranging from about three feet to about thirty feet and an internal diameter ranging from about 0.5 inch to about three inches. The inlet ports 12 can be positioned from one to three inches from the upper end of the reactor tube and have diameters ranging from about one-sixteenth to about three-eighths inch. The reactor tube 10 as well as other elements of this apparatus which may contact the corrosive substances employed and formed are preferably constructed of stainless steel or other acid-resistant material.

Telescoped within reactor tube 10 is insert 14 having outer surface 14a. This insert has a length ranging from about 6 inches to about 20 inches and a diameter at its top portion such that this portion fits loosely within the reactor tube. The insert is suspended within the reactor tube by flange 16 which extends peripherally about its top. This suspension permits the easy removal of insert 14 for cleaning. Insert 14 is centered within reactor tube 10 by protuberances 15 on the lower portion of insert outer surface 14a. Insert outer surface 14a is provided with a peripheral groove which contains a packing seal, such as O-ring 18, of "Teflon," or "Viton" or other resistant gasketing material, to seal the gap between outer surface 14a and reactor tube inner surface 10a whereby gaseous reactant is prevented from entering the liquid metering and distribution system hereinafter described.

Figure 2:
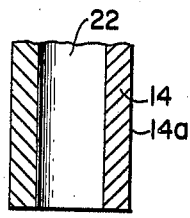
FIGURES 2 and 3 are fragmentary elevational views in section of alternative discharge ends of the axial passageway of the insert of the apparatus of FIGURE 1.
Figure 3:
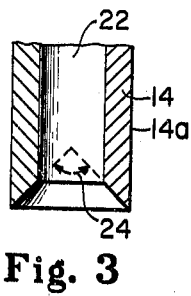

The insert 14 contains an axial passageway 22 in communication at its upper end with a source of gaseous reactant under a predetermined pressure, such as a gas inlet pipe (not shown). This passageway provides a uniform resistance to the gaseous reactant flow whereby in a multiple-tube reactor equal distribution of gas to each tube is achieved. Passageway 22 is preferably cylindrical and has a diameter ranging from about 0.25 inch to about 1.5 inches. The discharge end of passageway 22 can be coplanar with the lower end of insert 14, as shown in FIGURE 2, or, alternatively, can be tapered downwardly and outwardly as shown in FIGURE 3, the angle of inclusion 24 ranging from about 10 degrees to slightly less than 180 degrees. If this angle is less than about 10 degrees, entrainment of liquid reactant in the gas stream is excessive. A blunt discharge end, i.e., an angle of inclusion of 180 degrees, is preferred.

Referring again only to FIGURE 1, a second passageway is formed by the assembly of tube 10 and insert 14 intermediate reactor tube inner surface 10a and insert outer surface 14a. This second passageway provides the means by which the liquid reactant metering and distribution can be accomplished. It comprises a liquid reactant chamber 26, at least one metering orifice 28, a plenum chamber comprising a first chamber 30 and a second chamber 32 in series, and an annular discharge orifice 34.

Liquid reactant chamber 26 is annular. It is coterminous with a recess in the surface of insert 14, the outer wall being a portion of reactor tube inner surface 10a. The chamber 26 communicates with liquid inlet ports 12 and metering orifice 28 and is adapted to feed the liquid reactant to metering orifice 28.

Figure 4:
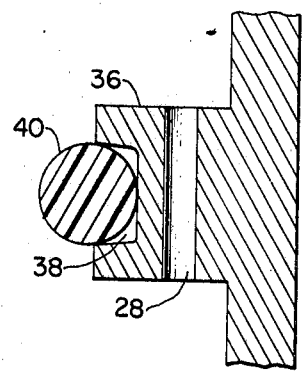
FIGURE 4 is a fragmentary elevational view in section of the metering orifice and the seal used in conjunction therewith of the apparatus of FIGURE 1.

The lower end of reactant chamber 26 is determined by an annular rib 36. This rib, shown most clearly in FIGURE 4, is provided with the vertically-disposed metering orifice 28 interconnecting reactant chamber 26 and the balance of the second passageway. Orifice 28 has a diameter ranging from about 0.015 inch to about 0.040 inch and a length ranging from about 0.25 inch to about 0.5 inch. It is sized to impart to the liquid reactant flowing from reactant chamber 26 a controlling pressure drop whereby this reactant flow is precisely metered. If its diameter is less than about 0.015 inch, orifice 28 plugs too easily. Annular rib 36 is also provided with a peripheral groove 38 containing a packing seal such as an O-ring 40, e.g., of "Viton," to seal the passageway between the periphery of rib 36 and reactor tube inner surface 10a and thereby to assure the passage of liquid reactant from the reactant chamber to the balance of the second passageway only by way of metering orifice 28.

The discharge end of metering orifice 28 communicates with a plenum chamber whereby sustained flow of liquid reactant is assured. This plenum chamber comprises two annular chambers in series, a first chamber 30 and a second chamber 32, the first chamber communicating with metering orifice 28 and with the second chamber, the second chamber connecting the first chamber and the annular discharge orifice 34. The first chamber 30 is thicker in the radial direction than the second chamber 32, this difference in thickness being caused by a step 14b in insert outer surface 14a. The first chamber 30 must have a thickness great enough to provide access to metering orifice 28 and can, for example, range from about 0.1 inch to about 0.5 inch. The axial length of chamber 30 is preferably less than about one inch so that its volume is minimized; otherwise this chamber is kept full of liquid with difficulty and air can be drawn into the system whereby excessive entrainment of liquid reactant in the gas reactant stream can occur.

The annular discharge orifice 34 is adapted to receive the liquid reactant from the metering orifice 28 via the plenum chamber and to distribute the reactant uniformly about the reactor tube inner surface 10a. The discharge orifice has a radial thickness ranging from about 0.005 inch to about 0.03 inch, preferably 0.01 inch to 0.02 inch, and an axial length ranging from about 0.5 inch to about 2 inches. The outer diameter of this orifice is defined by the inner diameter of reactor tube 10. The annular discharge orifice is sized to distribute the liquid as a uniform, thin, flowing annular film. This orifice together with the plenum chamber imparts to the liquid reactant flow a non-controlling pressure drop, that is a pressure drop which is small compared to the pressure drop through metering orifice 28. Because of this non-controlling pressure drop, discontinuities in the tube wall are not likely to affect feed rate and cause feed differences from tube to tube in a multiple-tube reactor; thus, metering accuracy is preserved. The discharge orifice 34, and the use of a non-controlling pressure drop through this orifice, also minimizes entrainment of the liquid reactant in the gas stream which is out of contact with the reactor tube surface utilized as a heat exchange surface. Moreover, the discharge orifice minimizes backmixing within the second passageway.

An especially preferred apparatus within the scope of the present invention is described as above and comprises a reactor tube 10 having a length of 20 feet and an inside diameter of 0.9 inch (and an outside diameter of one inch) and an insert 14 extending ten inches into the reactor tube and having an axial passageway 22 with a diameter of 0.5 inch. The reactor tube has four liquid inlet ports 12 each having a diameter of one-eighth inch. One metering orifice 28 is provided and this is 0.03 inch in diameter and five-thirty-seconds inch long. The plenum chamber comprises two chambers, the first chamber 30 being 0.5 inch long and 0.15 inch thick and the second chamber 32 being six inches long and 0.05 inch thick. Its annular discharge orifice 34 has an axial length of 1.5 inches and a radial thickness of 0.010 inch.

Besides the above described preferred embodiment of the apparatus various other forms of the apparatus are within the scope of the present invention. For example, the plenum chamber can be omitted entirely with many of the above benefits of precise metering afforded by orifice 28 and beneficial distribution of annular discharge orifice 34 preserved.

Figure 5:
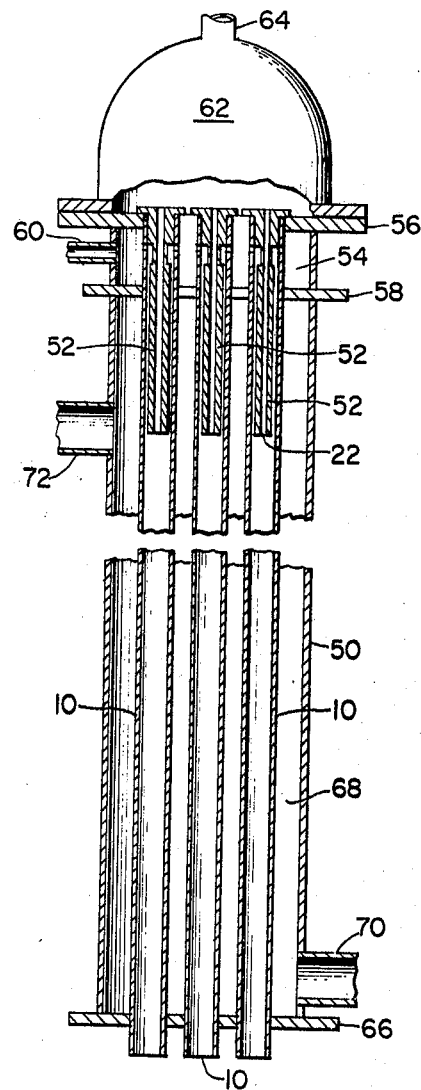
FIGURE 5 is a fragmentary elevational view, partially in section, of a multiple-tube film reactor having reactor tubes including the apparatus of FIGURE 1.

The above apparatus is especially useful as part of a multiple-tube film reactor, for example, the multiple-tube film reactor depicted in FIGURE 5. With continuing reference to this figure, there is shown a reactor which comprises a shell 50 which surrounds a plurality of similar reactor tubes 10. Each reactor tube 10 is provided with an insert 14, the combination comprising the present feed apparatus and being generally referred to as reference numeral 52. The apparatus 52 is depicted without detail in FIGURE 5 for convenience of presentation. Shell 50 contains in its top portion reservoir 54 for supplying liquid reactant at a predetermined pressure to the inlet ports 12 of the various reactor tubes 10. This reservoir is defined at the top and bottom by partitions 56 and 58, respectively, and contains liquid reactant inlet line 60. Above liquid reservoir 54 is gas reservoir 62 interconnecting apparatus 52 and gas inlet line 64 which leads to a source of gaseous reactant under a substantially constant pressure. Intermediate shell 50 and reactor tubes 10 and defined at the top and bottom by partitions 58 and 66, respectively, is a coolant circulation chamber 68. Chamber 68 is provided with coolant inlet line 70 and outlet line 72 and the circulation of the coolant, which can, for example, be water, is controlled by means known in the art (but not shown on the drawing) whereby to appropriately control the temperature of the reactor tubes despite the exothermic reaction occurring therein. Each feed apparatus 52 is substantially the same; equal liquid metering to each tube is achieved in this way and this contributes to the production of uniformly high quality product.

With the especially preferred apparatus described above and depicted in FIGURES 1, 2 and 4, liquid reactant and gaseous reactant are readily processed as follows: This process is described for convenience with respect to the film reaction of diluted gaseous sulfur trioxide and alpha-olefin containing from 10 to 26 carbon atoms. It is also useful for other film reactions, for example, the sulfonation of various organic compounds such as alkyl benzene, especially linear dodecyl benezene, or fatty alcohols such as tallow alcohol with gaseous sulfur trioxide. A fairly comprehensive list of such organic compounds is found in the copending application of Beyer and Motl Ser. No. 514,468 filed Dec. 17, 1965, which relates to the film sulfonation of organic compounds. The present apparatus is also useful for film reactions other than sulfonation reactions, for example, the hydrobromination or chlorination of alpha-olefins. A film reaction involving the hydrobromination of alpha-olefins in which this apparatus is useful is that of copending application of McCarty et al. Ser. No. 432,070, filed Feb. 4, 1965, now U.S. Patent No. 3,396,204.

Alpha-olefin, for example, having an average carbon chain length of 14, is pumped at room temperature and at a pressure ranging from about 5 to about 30 p.s.i.g. through liquid reactant inlet ports 12 into liquid reactant chamber 26. The olefin is prevented from contacting gaseous sulfur trioxide by seal 18. More viscous liquid reactants, for example, ethoxylated alcohols, are supplied at pressures in the upper portion of the above range, e.g., 20 to 30 p.s.i.g.

Under the hydrostatic pressure described above, the olefin is forced through metering orifice 28, which constricts the path of its flow and subjects it to a pressure drop ranging from 2 to about 30 p.s.i.g. This pressure drop is controlling in that it is substantially larger than the pressure drop through the remainder of the liquid metering and distributing system, for example, from 5 to 20 times as large. This controlling pressure drop provides precise metering of olefin reactant. If pressure drops lower than those in the range mentioned above are employed, precise metering will not be achieved. If pressure drops greater than those in the above range are employed, a very high pressure and thus uneconomical liquid reactant supply system will be required to drive the liquid reactant through the system. The olefin reactant is metered through orifice 28 at a rate ranging from about 10 to about 30 pounds per hour.

The olefin metered by orifice 28 is received by annular chambers 30 and 32 which comprise a plenum chamber, which is always kept full of the liquid. For this reason, sustained flow of olefin from the plenum chamber to annular discharge orifice 34 is assured. Alternatively, olefin can be metered directly from metering orifice 28 into annular discharge orifice 34. The discharge orifice forms the olefin into an annular flowing film having a thickness ranging from about 0.005 to about 0.030 inch and directs this flowing film into the reaction zone at a specific stock rate ranging from about 3.5 to about 10.6 lbs./hr./circumferential inch of the inner surface 10a of tube 10. The film flow for the most part is non-turbulent but there may be a slight amount of turbulence at the film surface. The pressure drop undergone by the olefin in passing through the plenum chamber and annular discharge orifice ranges from about 0.02 to about 1 p.s.i.g. This pressure drop is non-controlling when compared to the 2 to 30 p.s.i.g. pressure drop experienced through the metering orifice and thus metering accuracy is preserved and entrainment is minimized. The metering accuracy enables close control of the reaction in the reaction zone and thus charring is eliminated or significantly reduced. The annulus of discharge orifice 34 is sufficiently small in radial thickness that the reactants do not contact each other outside the reaction zone where heat exchange is available, i.e., within the second passageway.

Diluted gaseous sulfur trioxide from any convenient source, for example, from a gas inlet pipe communicating with a sulfur trioxide vaporizer and a dilution system, such as a gas mixture wherein the volumetric ratio of inert diluent gas to sulfur trioxide ranges from about 10:1 to about 100:1, is introduced at a pressure ranging from about 3 to about 18 p.s.i.g. into axial passageway 22. This pressure forces the gas through passageway 22 with a pressure drop ranging from about 1 to about 5 p.s.i.g. Passageway 22 directs the gas into reactor tube 10 adjacent the lower end of insert 14 centrally of the annular flowing film of olefin which has also been directed into the reactor tube. The gas is metered into the reactor tube at a rate ranging from about 15 to about 50 standard cubic feet per minute, the mole ratio of sulfur trioxide to olefin ranging from about 0.85:1 to about 1.3:1. The gas entering reactor tube 10 diffuses and contacts the olefin film whereby reaction occurs. The zone of this contact is the reaction zone. The reactor tube 10 adjacent this zone is a heat exchange surface. The temperature of reaction is controlled by heat exchange through this surface. This temperature depends upon the particular chain length of the olefin employed but in general ranges from about −20° F. to about 300° F.

With the apparatus depicted in FIGURE 5, olefin is introduced into liquid reactant reservoir 54 through inlet line 60. From reservoir 54, the olefin passes through inlet ports 12 into each of the reactor tubes 10. The olefin thus is supplied to each tube of the present apparatus 52 wherein equal metering of olefin to each reaction zone occurs. Sulfur trioxide is introduced through inlet line 64 into reservoir 62 from where it passes into each of the axial passageways 22 of the various apparatus 52. These axial passageways provide equal gas flow rates to each tube. In this way uniformly high quality product is produced. The pressures, flow rates and other details described in connection with the apparatus of FIGURES 1, 2 and 4 are equally applicable to each of the apparatus 52 of FIGURE 5 and therefore not repeated.

The following specific example is merely illustrative of the process of the present invention as described generically above and is not to be construed in any way as limiting its scope. In this example, the especially preferred feed apparatus described above and depicted in FIGURES 1, 2 and 4 is employed together with a multiple tube film reactor described above and depicted in FIGURE 5. The multiple tube reactor contains three reactor tubes. The temperature of reaction given hereinafter is an average temperature over the entire reaction zone. Uniformly high quality product is produced. This product can be converted into an excellent detergent suitable for cleaning, for example, soiled dishes.

EXAMPLE

| | |
|---|---|
| Organic reactant | 1-tetradecene. |
| Gaseous reactant | Diluted $SO_3$ (by volume 97.7% air, 2.3% $SO_3$). |
| Organic reactant metering rate (lbs./hr./tube) | 20. |
| Pressure drop through metering orifice 28 (p.s.i.g.) | 7 p.s.i.g. |
| Pressure drop through plenum chamber and annular discharge orifice 34 (p.s.i.g.) | 0.3 p.s.i.g. |
| Gas flow rate to each tube (Standard cubic feet per minute) | 35. |
| Molar ratio ($SO_3$/olefin) | 1.05. |
| Average film thickness over entire length of reaction zone | 0.035 inch. |
| Average temperature of reaction | 150° F. |
| Reaction completeness | 96%. |

The foregoing description has been presented describing certain operable and preferred embodiments of this invention. Other variations will be apparent to those skilled in the art.

What is claimed is:

1. An apparatus for introducing gas and liquid reactants into a film reactor tube, said apparatus comprising a vertical reactor tube having an insert telescoped therein, said insert having an axial passageway therethrough, a second passageway intermediate the reactor tube inner surface and the outer surface of said insert, a liquid reactant chamber and a plenum chamber comprising said second passageway, said liquid reactant chamber being adapted to feed said liquid reactant under a predetermined pressure to said plenum chamber, at least one metering orifice establishing communication between said liquid reactant chamber and the said plenum chamber whereby sustained flow of the liquid reactant is assured, said metering orifice being sized to impart to the liquid reactant flow a controlling pressure drop, the lower end of said second passageway comprising an annular discharge orifice adapted to receive the liquid reactant from the said plenum chamber and distribute the reactant about the inner surface of said reactor tube, the annulus of said discharge orifice being sized to impart a non-controlling pressure drop to the liquid reactant flow, the upper end of said axial passageway being in communication with a source of gaseous reactant under a predetermined pressure whereby said gaseous reactant is caused to flow through said axial passageway into the portion of the reactor tube adjacent the lower end of said insert at a constant flow rate.

2. The apparatus of claim 1 wherein the plenum chamber comprises two annular chambers in series, the first annular chamber having a greater thickness than the second, the second annular chamber immediately preceding the annular discharge orifice and being of greater thickness than said orifice whereby the plenum chamber volume is minimized.

3. A multiple-tube film reactor comprising a shell surrounding a plurality of reactor tubes including the apparatus of claim 1, each reactor tube and included apparatus being substantially the same, said shell containing a reservoir in its top portion for supplying liquid reactant at a predetermined pressure to the various reactor tubes, whereby equal liquid reactant metering to each tube is achieved.

4. The apparatus of claim 1 wherein the metering orifice has a diameter ranging from about 0.015 inch to about 0.040 inch and a length ranging from about 0.25 to about 0.5 inch and the annulus of the discharge orifice has a radial thickness ranging from about 0.005 inch to about 0.03 inch and an axial length ranging from about 0.5 inch to about 2 inches.

5. The apparatus of claim 4 wherein the axial passageway is tapered at its discharge end, the angle of inclusion of said taper ranging from about 10 degrees to slightly less than 180 degrees.

6. The apparatus of claim 4 wherein the lower end of the reactant chamber is determined by an annular rib on the insert outer surface, said rib containing the metering orifice and means to seal the passageway between the periphery of said rib and the reactor tube inner surface.

7. The apparatus of claim 6 wherein the insert is suspended in the reactor tube by a flange extending from the top of said insert and the second passageway is sealed at its upper end by a packing seal contained in a peripheral groove above the reactant chamber whereby gaseous reactant is prevented from entering said second passageway.

References Cited

UNITED STATES PATENTS

| | | | |
|---|---|---|---|
| 2,119,886 | 7/1935 | Myers | 83—46 |
| 2,923,728 | 2/1960 | Falk et al. | 260—459 |
| 3,169,142 | 2/1965 | Knaggs et al. | |
| 3,270,038 | 8/1966 | Marshall et al. | 260—460 X |
| 3,318,588 | 5/1967 | Russel et al. | 261—153 |
| 3,328,460 | 6/1967 | Mey | 260—686 X |

FOREIGN PATENTS

| | | |
|---|---|---|
| 634,264 | 9/1962 | South Africa. |
| 650,578 | 2/1964 | South Africa. |

MORRIS O. WOLK, Primary Examiner

S. MARANTZ, Assistant Examiner

U.S. Cl. X.R.

260—460, 686; 261—112, 153